United States Patent [19]

Holly, III

[11] Patent Number: 4,950,934

[45] Date of Patent: Aug. 21, 1990

[54] ADJUSTABLE SECUREMENT SYSTEM FOR END WINDING CONDUCTORS

[75] Inventor: Henry M. Holly, III, Winter Park, Fla.

[73] Assignee: Westinghouse Electric Corp., Pittsburgh, Pa.

[21] Appl. No.: 393,155

[22] Filed: Aug. 14, 1989

[51] Int. Cl.⁵ .............................................. H02K 3/46
[52] U.S. Cl. .................................... 310/260; 310/214; 310/270
[58] Field of Search .................. 310/260, 270, 51, 91, 310/194, 214

[56] References Cited

U.S. PATENT DOCUMENTS

| | | | |
|---|---|---|---|
| 3,500,093 | 3/1970 | Wharton et al. | 310/270 |
| 3,739,212 | 6/1973 | Koelbel et al. | 310/194 |
| 3,743,395 | 7/1973 | Koechlin | 310/270 |
| 3,949,256 | 4/1976 | Cooper et al. | 310/260 |
| 3,949,257 | 4/1976 | Cooper et al. | 310/260 |
| 4,068,142 | 1/1978 | Gillet et al. | 310/194 |

FOREIGN PATENT DOCUMENTS

| | | | |
|---|---|---|---|
| 0078342 | 5/1982 | Japan | 310/194 |
| 0371648 | 5/1973 | U.S.S.R. | 310/260 |
| 1204502 | 9/1970 | United Kingdom | 310/270 |

Primary Examiner—R. S. Skudy

[57] ABSTRACT

A biased securement system for the end winding conductors of a turbine generator includes a support ring with a biased wedge system located between the end windings to compress them in both a radial and circumferential direction. A triangular shaped wedge is secured to the support ring between a pair of confronting spacer blocks having angular surfaces converging in the direction of the support ring. Belleville washers are disposed in a recess in one of the spacer blocks, with a slide plate therebetween which is held in place by a lock plate to retain the same in position.

7 Claims, 4 Drawing Sheets a triangular shaped wedge slidable between the confronting surfaces. A bolt passing through the triangular shaped wedge secures the same to the support ring while biasing means such as belleville washers are disposed between the triangular shaped wedge and the spacer blocks, the belleville washers seated in a recess formed in the angular surface of the spacer blocks. Preferably, a plurality of belleville washers are provided, with each washer seated in a separate pocket formed in the spacer block.

ADJUSTABLE SECUREMENT SYSTEM FOR END WINDING CONDUCTORS

CROSS REFERENCE TO RELATED APPLICATION

This application is related to application Ser. No. 340,196 filed Apr. 19, 1989 in the names of John M. Butler and Hector 0. Ponce and assigned to the assignee of the present invention.

FIELD OF THE INVENTION

The present invention relates to a biased securement system for end winding conductors of a turbine generator stator which provides support for the end winding conductors in both a radial and circumferential direction.

BACKGROUND OF THE INVENTION

As described in the above-identified co-pending related application, the contents of which are incorporated by reference herein, conformable pads or blocks are conventionally used to brace or secure the end winding conductors of large turbine generators to support rings surrounding the conductors. Such pads are usually in the form of resin-impregnated, resilient material in the form of felt pads or hose-like members.

In the aforementioned co-pending application, a securement system is described that uses a large ring around the periphery of the windinqs that provides compression of the end winding conductors in both a radial and circumferential direction. The securement system is comprised of a biased wedge system that includes a pair of confronting blocks. A biasing means such as a belleville spring washer biases the wedge toward the support ring. The spacer blocks may be of L-shaped design or rectangular shaped and have confronting angular surfaces that converge in the direction of the support ring with a triangular shaped wedge slidable along the confronting angular surfaces. The wedge is secured to the support ring by use of a bolt passing through the wedge with the belleville spring washers disposed between the wedge and the head of the bolt to bias the same and the end winding conductors.

While the above-described system is very useful, the provision of the belleville washers between the wedge and the head of the bolt detracts from the compact nature of the system, and masking of the exposed belleville washers is used before painting of the winding, and an epoxy soaked glass cord is used about the bolt head.

It is an object of the present invention to provide a securement system for end winding conductors that is more compact in nature and eliminates the use of exposed belleville washers, while still providing the required biasing of the windings.

SUMMARY OF THE INVENTION

A biased securement system for end winding conductors of an electromechanical apparatus, such as a turbine generator, has a support ring disposed about a plurality of peripherally spaced end windings and a biased wedge system located between the end windings to compress the windings in both a radial and circumferential direction.

The biased wedge system includes a pair of confronting spacer blocks which have confronting angular surfaces that converge in the direction of the support ring

DESCRIPTION OF THE DRAWINGS

The invention will become more readily apparent from the following description of preferred embodiments thereof shown, by way of example only, in the accompanying drawings, wherein.

DETAILED DESCRIPTION

Figure 1:
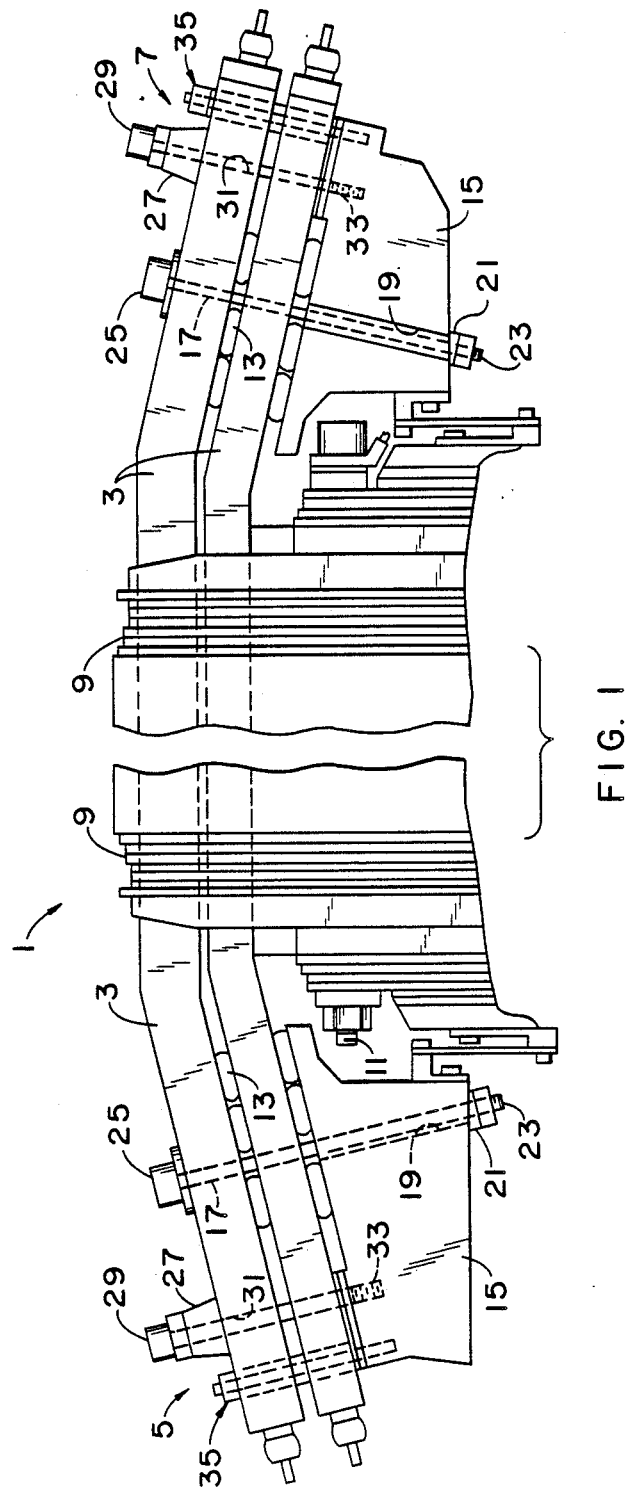
FIG. 1 is a partial view of a turbine generator, showing both the exciter end and the turbine end, using the biased securement system of the present invention.

Referring now to FIG. 1, a turbine generator 1 is illustrated showing end winding conductors 3 at both the exciter end 5 and the turbine end 7 of the generator. The turbine generator 1 includes a stator iron core 9 held together by bolts 11. Spacers 13 are provided between end winding conductors and a support cone or ring 15 surrounds the outer periphery of the end winding conductors 3. Radial studs 17 pass between the end winding conductors 3 and through an aperture 19 in the support ring 15, with a bolt 21 securing the studs at the threaded end 23 opposite the head 25 of the studs 17. A supplemental support ring 27, on the opposite side of the end winding conductors 3 from the support ring 15 is held in place against the end winding conductors 3 by a bolt 29 passing through an aperture 31 therein, which bolt is threadedly engaged in a threaded bore 33 in support ring 15.

Figure 2:
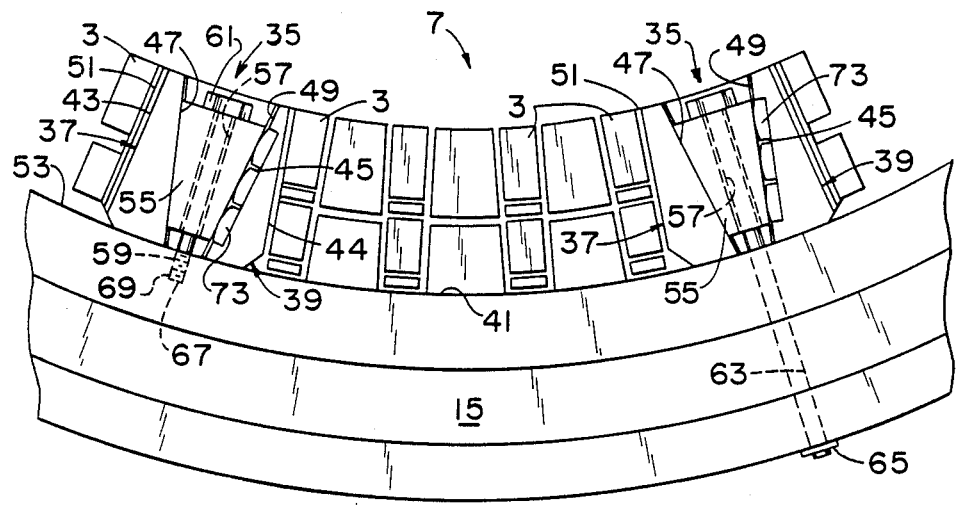
FIG. 2 is a partial view, with cut-away section, illustrating the biased securement system securing end winding conductors at the turbine end of the turbine generator of FIG. 1.
Figure 3:
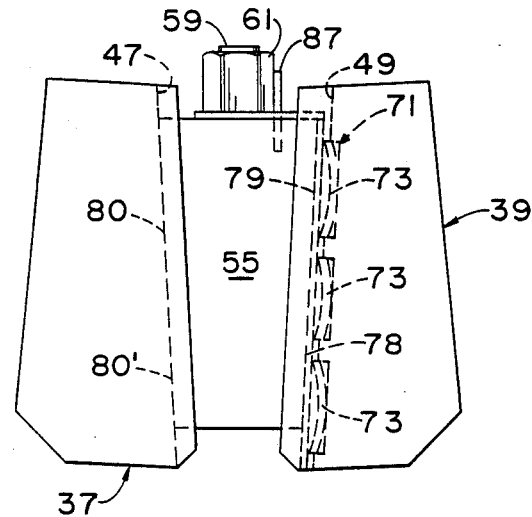
FIG. 3 is an elevational view of two spacer blocks and associated triangular shaped wedge in biasing position.

The biased wedge system 35 of the present invention is shown at the outer axial end of the support ring 15 and is illustrated in FIG. 2 at the turbine end 7 of the turbine generator 1.

As illustrated in FIG. 2, in a first embodiment of the biased securement system 35 for use at the turbine end 7 of a generator, a pair of spacer blocks 37 and 39 are provided flush with the inner surface 41 of the support ring 15 and disposed between the end winding conductors 3. The blocks 37 and 39 are provided in a substantially trapezoidal shape, with the outermost radial straight end 43 and 44 thereof contacting a pair of parallel spaced end winding conductors 3. The blocks 37 and 39 each have recesses 45 formed thereon, the recesses 45 having a confronting angular surface 47 and 49, respectively, which converge in the direction of the support ring 15. Conforming spacers 51, such as resin impregnated Dacron felt pads, are positioned between the radial outer end 43 of block 37 and adjacent end winding conductor 3 and between the radial outer end of blocks 44 of blocks 39 and the adjacent end winding conductor. A thin flexible shear layer 53 is provided between the biased wedge system and support ring 15, on the inner surface 41 of the support ring 15.

A triangular shaped wedge 55 is provided having a passageway 57 therethrough which is adapted to fit between the angular surface 47 and 49 on the blocks 37 and 39. A bolt 59, having a head nut 61, extends through the passageway, and through a bore 63 in the end ring 15, which with nut 65 engages the triangular shaped wedge 55 with the end ring 15, or, the and 67 of a bolt 59 may be threadedly engaged in a threaded bore 69 formed in the end ring 15. The passageway 57 may be deliberately enlarged and slotted, which will eliminate the need for installing the assembly exactly in line with 63. It is important that the wedge 55 not bind against the bolt 59 so as to achieve consistent loading.

Figure 4:
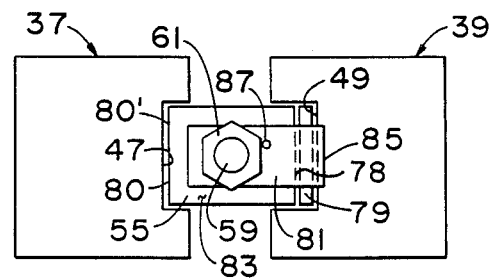
FIG. 4 is a top plan view of the two spacer blocks and wedge shown, in FIG. 3.
Figure 5:
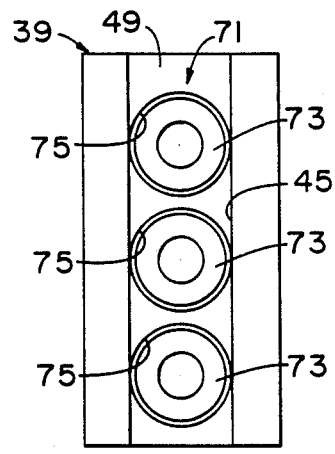
FIG. 5 is a view of a spacer block looking towards the recess showing the belleville washers in location.
Figure 6:
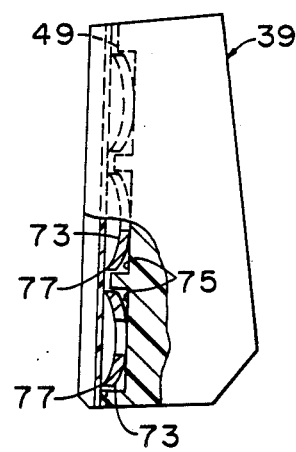
FIG. 6 is a side view of a spacer block containing the belleville washers with a portion thereof cutaway.
Figure 7:
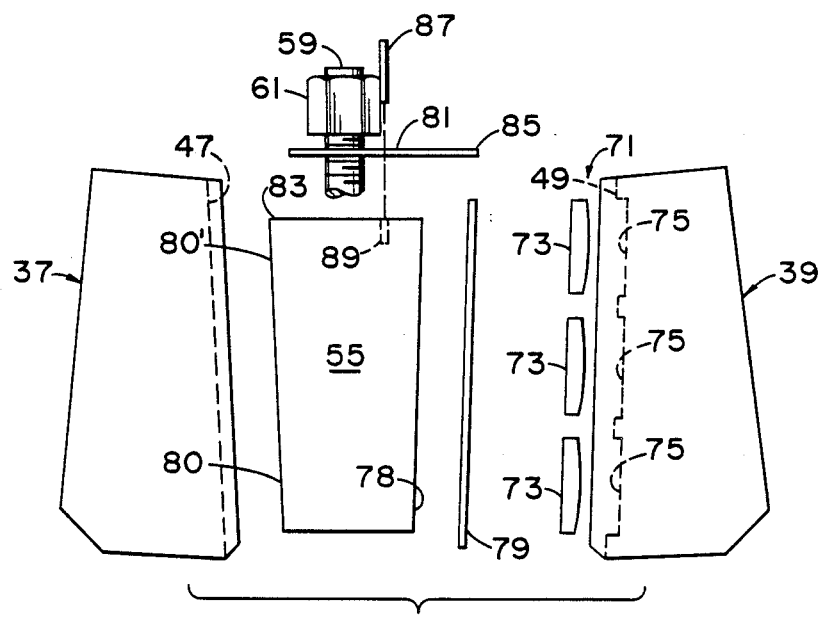
FIG. 7 is an exploded view of the embodiment shown in FIG. 3.

A biasing means 71, such as belleville washers 73 are used to bias the spacer block 39 against adjacent end windings 3. As shown in FIGS. 4 to 6, the belleville washers 73 are retained in pockets 75 formed in the recess 45 in the spacer block 39 and exposed portion 77 thereof extends outwardly from the recess 45 in the direction of the triangular shaped wedge 55. Between the exposed portions 77 of the belleville washers 73 and the surface 78 of the triangular shaped wedge 55 is a slide plate 79, such as a Teflon strip, which provides for a sliding interface therebetween. The wedge surface or contacting surface may be coated with a Teflon material, or other friction-reducing material, to reduce the high friction coefficients commonly found with fiberglass surfaces. Teflon adhesive tapes are readily available in thicknesses as low as 0.002 inch. A coating 80', of Teflon or other friction-reducing material, is also provided on the opposite surface 80 of the triangular shaped wedge. This coating may be on the surface 80 of the triangular shaped wedge 55, on the angular surface 47 of block 37, or on both. A lock plate 81, secured to the upper surface 83 of the wedge 55 by the head nut 61 of bolt 59, has a distal end 85 which extends above the slide plate 79 to retain the same between the belleville washers 73 and triangular shaped wedge 55. A locking pin 87 is provided which passes through the lock plate and is engaged in a locking pin bore 89 in the upper surface 83 of the triangular shaped wedge 55 to prevent undesired loosening of the head nut 61.

In operation, the spacer blocks 37 and 39 are inserted between specified end windings 3. The belleville washers 73 are placed in the pockets 75 in angular surface 49 of a space block 37 or 39 with portions 77 thereof exposed. The triangular shaped wedge 55 is then inserted between confronting angular surfaces 47 and 49 with a slide plate 79 disposed between the wedge and the belleville washers. The bolt 59, such as a fiberglass bolt, is inserted through passageway 57 in triangular shaped wedge 55 with locking plate 81 carried thereon between the head nut 61, such as a fiberglass nut, and the upper surface 83 of the wedge 55. Securement of the bolt either by a nut 65 by threading in bore 69 in the support ring 15 is effected, and locking pin 87 secured in place to lock the head nut 61.

Preferably, as illustrated, three belleville washers 73 are seated in three pockets 75 in the spacer block 39, such that the washers are locked into position to prevent the possibility of the washers becoming dislodged during operation. The slide plate 79 provides a sliding interface to uniformly distribute the wedge face over the three washers and prevent the wedge 55 from gouging into the washers 73 when the assembly is installed. As with the washers, the slide plate 79 is disposed in the recess 45 to prevent migration during operation. The lock plate 81 overlays the top of the slide plate 79 completely locking the slide plate in position.

Figure 8:
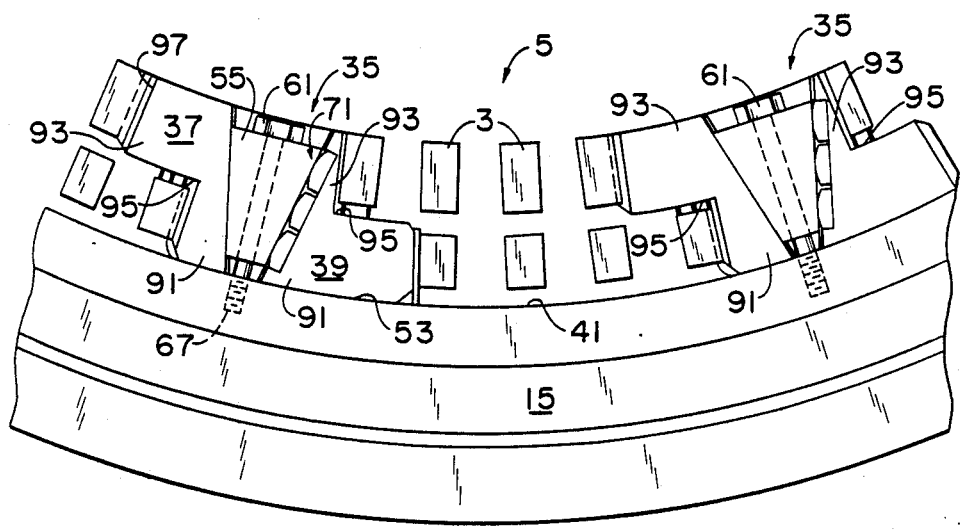
FIG. 8 is a partial view, with cut-away section, illustrating the biased securement system securing end winding conductors at the exciter end of the turbine generator of FIG. 1.

In the embodiment illustrated in FIG. 8, where the biased wedge system 35 is used at the exciter end 5 of a generator, the pair of spacer blocks 37 and 39 are L-shaped blocks having a vertical portion 91 and horizontal leg portion 93. An end winding conductor 3 is seated in a hollow 95 of the L-shaped blocks 37, 39, while the outermost radial end 97 of the L-shaped blocks are in contact with a radially spaced adjacent end winding conductor 3, with this embodiment thus usable where circumferentially offset end winding conductors are present.

Figure 9:
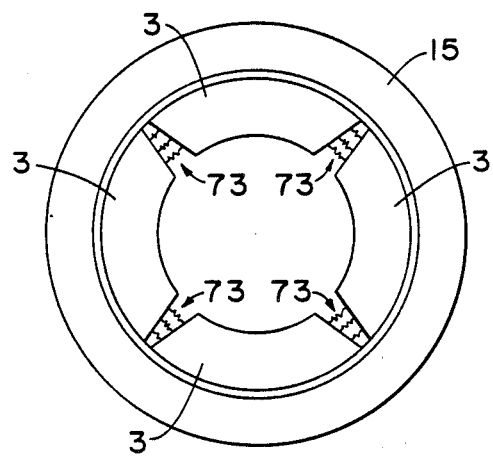
FIG. 9 is a schematic representation of the control of hoop stresses by the use of the present invention.

The present invention has an additional advantage over prior art devices and the device illustrated in copending application Ser. No. 340,196 in the ability to relieve compressive hoop stresses by control and proper sizing (thickness and diameter) of the belleville washers used. As illustrated schematically in FIG. 9, in end winding designs that use a high stiffness/low thermal expansion fiberglass support cone 15, the belleville washers 73 permit relieving of hoop stresses built up in the end winding system, by permitting movement between the end winding conductors and the securement system 35 through the flexing of the belleville washers 73.

The present securement system containing the biased wedge system 35 provides for compactness, while no exposed belleville washers require masking before painting of the winding, and also no hand tying of the bolt with epoxy saturated glass cord is needed. The present system can be repeatedly used when retightening is desired.

What is claimed is:

1. A biased securement system for end windings of an electromechanical apparatus comprising:
   a support ring disposed about a plurality of peripherally spaced said end windings;
   a biased wedge system located between said spaced end windings to compress said end windings in both a radial and circumferential direction;
   said biased wedge system including a pair of confronting spacer blocks having a confronting angular surface which converge in the direction of said support ring and a triangular shaped wedge slidable between said confronting spacer blocks;
   means for securing said triangular shaped wedge to said support ring; and
   biasing means, comprised of a plurality of belleville washers, disposed between said triangular shaped wedge and at least one said confronting spacer blocks to bias the same in a circumferential direction.

2. A biased securement system for end winding conductors of an electromechanical apparatus as defined in claim 1 wherein at least one of said confronting spacer blocks has a recess formed in said angular surface and the belleville washers are disposed adjacent each other in said recess and extend outwardly therefrom.

3. A biased securement system for end winding conductors of an electromechanical apparatus as defined in claim 2 wherein pockets are provided in said recess in said spacer block and each pocket contains at least one of said belleville washers.

4. A biased securement system for end winding conductors of an electromechanical apparatus as defined in claim 2 wherein a slide plate is provided between said triangular shaped wedge and said belleville washers, and a friction-reducing coating is provided on the opposite surface of the triangular shaped wedge.

5. A biased securement system for end winding conductors of an electromechanical apparatus as defined in claim 4 wherein a lock plate is secured to the upper surface of the triangular shaped wedge having a distal end which extends above the slide plate to retain the same between the belleville washers and the triangular shaped wedge.

6. A biased securement system for end windings of an electromechanical apparatus comprising:

a support ring disposed about a plurality of peripherally spaced said end windings;

a biased wedge system located between said spaced end windings to compress said end windings in both a radial and circumferential direction;

said biased wedge system including a pair of confronting spacer blocks having a confronting angular surface which converge in the direction of said support ring, at least one of said confronting spacer blocks having a recess formed in said angular surface with pockets provided in said recess, and a triangular shaped wedge slidable between said spacer blocks;

means for securing said triangular shaped wedge to said support ring; and belleville washers disposed between said triangular shaped wedge and said at least one of said confronting spacer blocks in said pockets to bias the same in a circumferential direction.

7. The biased securement system for end winding conductors of an electromechanical apparatus as defined in claim 6 wherein a slide plate is provided between said triangular shaped wedge and said belleville washers and a lock plate is secured to the upper surface of the triangular shaped wedge, having a distal end which extends above the slide plate to retain the same between the belleville washers and the triangular shaped wedge.

* * * * *